United States Patent [19]
Moore

[11] Patent Number: 4,543,010
[45] Date of Patent: Sep. 24, 1985

[54] JOINT MEANS

[75] Inventor: Alan F. Moore, Burbage, England

[73] Assignee: Dunlop Limited, London, England

[21] Appl. No.: 423,297

[22] Filed: Sep. 24, 1982

[30] Foreign Application Priority Data

Dec. 1, 1981 [GB] United Kingdom ............... 8136250

[51] Int. Cl.$^4$ .............................................. F16D 1/00
[52] U.S. Cl. ..................................... 403/225; 403/228
[58] Field of Search ............... 403/228, 225, 220, 224, 403/116, 120

[56] References Cited

U.S. PATENT DOCUMENTS

| 2,011,817 | 8/1935 | Littlefield | 403/224 X |
| 2,043,015 | 6/1936 | Shutts | 403/228 X |
| 2,578,809 | 12/1951 | Ketchum | 403/225 X |
| 3,111,172 | 11/1963 | Gorndt et al. | 403/220 X |
| 3,377,110 | 4/1968 | Boggs | 403/228 X |
| 3,504,903 | 4/1970 | Irwin | 403/225 X |
| 4,349,184 | 9/1982 | Peterson et al. | 403/228 X |

FOREIGN PATENT DOCUMENTS

| 988401 | 4/1965 | United Kingdom . | |
| 1068563 | 5/1967 | United Kingdom . | |
| 1107199 | 3/1968 | United Kingdom . | |
| 1129157 | 10/1968 | United Kingdom . | |
| 1251328 | 10/1971 | United Kingdom . | |
| 1289408 | 9/1972 | United Kingdom . | |
| 1328744 | 8/1973 | United Kingdom . | |
| 1409563 | 10/1975 | United Kingdom . | |
| 1543142 | 3/1979 | United Kingdom . | |
| 2051704 | 1/1981 | United Kingdom . | |
| 2064064 | 6/1981 | United Kingdom | 403/228 |
| 2094393 | 9/1982 | United Kingdom | 403/220 |

Primary Examiner—Dennis L. Taylor
Attorney, Agent, or Firm—Stevens, Davis, Miller & Mosher

[57] ABSTRACT

Joint means for flexibly coupling a first member having a body portion and at least two arms extending from the body portion generally parallel to and radially spaced from the longitudinal axis of the joint means to a second member positioned radially inwards of said arms comprises elastomeric means acting between an internal curved surface on the body portion of the first member and an external curved surface on the second member opposite to and axially spaced from said internal curved surface.

8 Claims, 4 Drawing Figures

JOINT MEANS

This invention concerns improvements in or relating to joint means for flexibly coupling a pair of members and in particular to joint means which accommodates relative pivotal movement between the members.

According to the present invention there is provided joint means for flexibly coupling a first member having a body portion and at least two arms extending from the body portion generally parallel to and radially spaced from the longitudinal axis of the joint means to a second member positioned radially inwards of said arms, the joint means comprising an internal curved surface on the body portion of the first member, an external curved surface on the second member opposite to and axially spaced from said internal curved surface and elastomeric means acting between said curved surfaces.

The curved surfaces may be part-cylindrical but more preferably are part-spherical to allow relative pivotal movement between the members in any direction through 360° about the longitudinal axis of the joint means, i.e. omnidirectional movement in any plane containing the longitudinal axis of the joint means.

Preferably the curved surfaces have a common central axis (part-cylindrical) or centre of curvature (part-spherical).

Preferably the arms of the first member are uniformly spaced in a circumferential direction and the free ends of the arms may be adapted for connection to a common attachment member for securing the arms to one of two components to be connected by the joint means.

The elastomeric means preferably comprises a laminated bearing consisting of interleaving layers of elastomeric material e.g. rubber and substantially inextensible reinforcement material e.g. metal plate but may comprise elastomeric material only. The bearing has end faces complementary to the profile of the curved surfaces and where it is of laminated construction the individual layers are of similar curved profile. The end faces of the bearing may be bonded to the curved surfaces or attached to metal end rings which are secured to the curved surfaces by any known means.

The bearing, which may have a central opening serving as a vent to prevent air being trapped during moulding of the bearing, may be one-piece or consist of a plurality of individual segments.

Two of the joint means may be arranged back-to-back with the arms of the first members being intercalated with one another and extending in opposite directions and the second members being positioned in the recess formed between the body portions of the first members and the axially extending arms.

The invention will now be described in more detail, by way of example only, with reference to the accompanying drawings wherein.

Figure 1:
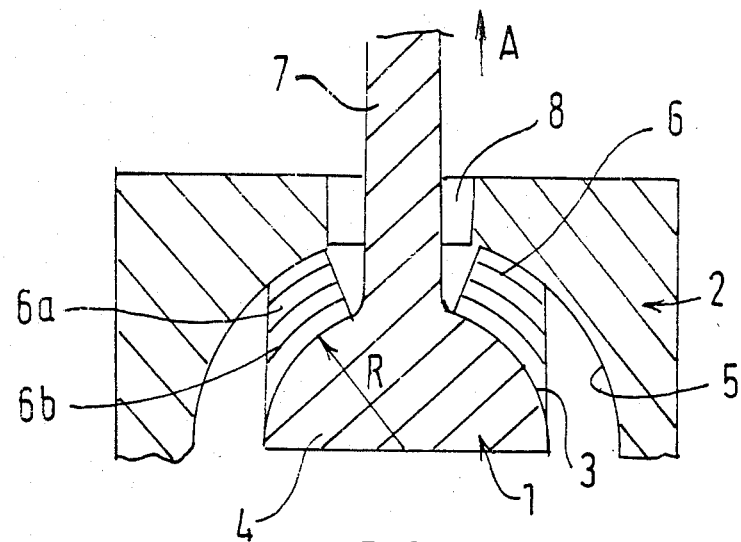
FIG. 1 shows in longitudinal section a known joint means.

One form of known joint means shown in FIG. 1 of the accompanying drawings for flexibly coupling a pair of rigid members 1 and 2 comprises an external part-spherical surface 3 on a body portion 4 of inner member 1 axially aligned with and opposite to an internal part-spherical surface 5 of outer member 2 and an annular spherical laminated bearing 6 acting between and bonded to the confronting surfaces 3,5. The surfaces 3,5 have a common centre of curvature.

Inner member 1 is adapted for connection to a component (not shown) via a stem 7 integral with the body portion 4 which projects through a central opening 8 in the end face of member 2 and is coaxial with the longitudinal axis of the joint means. Member 2 is adapted for connection to a second component (not shown) by any suitable means (not shown) e.g. bolting, welding, etc.

The laminated bearing 6 comprises a plurality of annular part-spherical rings consisting of layers of elastomer 6a and rigid reinforcement plates 6b arranged alternately with the end rings being of complementary profile to the confronting surfaces 3,5.

In use axial loads generated for example by a tension force applied to the stem 7 in the direction of arrow A are accommodated by the bearing 6 in compression and conical deflection of the stem 7 in any direction through 360° about the longitudinal axis of the joint means is accommodated by the bearing 6 in shear.

Figure 2:
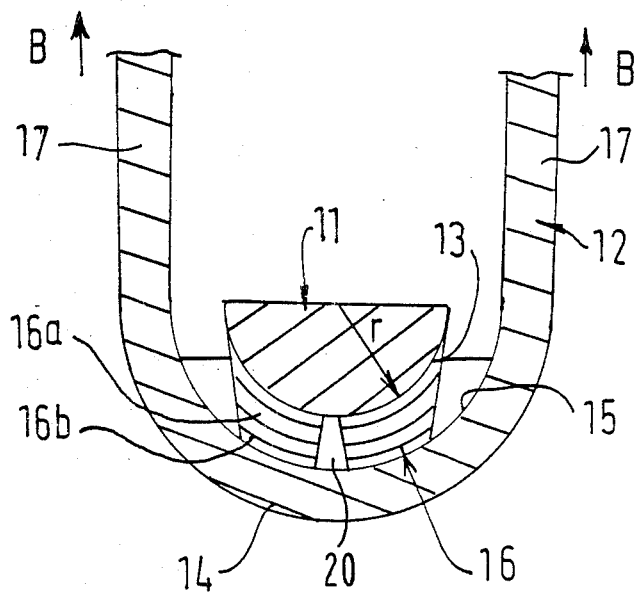
FIG. 2 shows in longitudinal section a first embodiment of joint means according to the present invention.

Referring now to FIG. 2 a first embodiment of joint means according to the present invention for flexibly coupling a pair of rigid members 11 and 12 is shown which comprises an external part-spherical surface 13 on inner member 11 axially aligned with and opposite to an internal part-spherical surface 15 on a body portion 14 of outer member 12 and an annular spherical laminated bearing 16 acting between and secured to the confronting surfaces 13, 15. The surfaces 13,15 have a common centre of curvature.

Outer member 12 has, integral with the body portion 14, a pair of diametrically opposed arms 17 extending parallel with and radially spaced from the central longitudinal axis of the joint means for connecting the member 12 to a component (not shown). Inner member 11 is adapted for connection to a second component (not shown) by any suitable means e.g. by bolting, welding etc.

The laminated bearing 16 comprises a plurality of annular part-spherical rings consisting of layers of elastomer 16a and rigid reinforcement plates 16b arranged alternately with the end rings being of complementary profile to the confronting surfaces 13,15.

In use axial loads generated for example by a tension force applied to the arms 17 in the direction of arrow B are accommodated by the bearing 16 in compression and conical deflection of the arms 17 in any direction through 360° about the longitudinal axis of the joint means is accommodated by the bearing 16 in shear.

The above-described joint means of FIGS. 1 and 2 are each suitable for applications in which tension loadings are applied to the stem 7 of inner member 1 in the case of the joint means of FIG. 1 and to the arms 17 of outer member 12 in the case of the joint means of FIG. 2 and the other member is attached to a fixed structure. One such application is the fastening of the ends of an anchor line to a floating oil rig platform and to the sea bed respectively where the anchor line is subjected to varying tension forces and deflection.

However, from a comparison of the joint means it is apparent that the stem 7 of inner member 1 of the joint means of FIG. 1 restricts the space available for location of the bearing 6 whereas no such space restriction is present in the joint means of FIG. 2 where the arms 17 are radially spaced from the longitudinal axis of the joint means. Thus assuming the joint means of FIG. 1 is to accommodate the same axial loading as the joint means of FIG. 2 the radius R of the curved surface 3 must exceed the radius r of the curved surface 13 by an amount sufficient to ensure the surface areas over which the bearings 6,16 act are the same. Consequently it is clear that the joint means of FIG. 1 will require a larger space envelope than the joint means of FIG. 2 for a given load.

A further advantage of the radius of the curved surface of the inner member in the joint means according to the present invention being less than that of the to the present invention being less than that of the known joint means is that for a given conical deflection the relative movement between successive layers of elastomer and reinforcement plates in the laminated bearing is less in the joint means according to the present invention than in the known joint means of FIG. 1. Consequently the elastomer layers in the joint means according to the present invention may be made thinner which together with the overall reduction in size contributes to a cost saving as compared with the known joint means. Furthermore the conical fatigue life of the bearing 16 is improved due to the reduction in relative movement between successive layers of elastomer and reinforcement plates for a given conical deflection.

Figure 3:
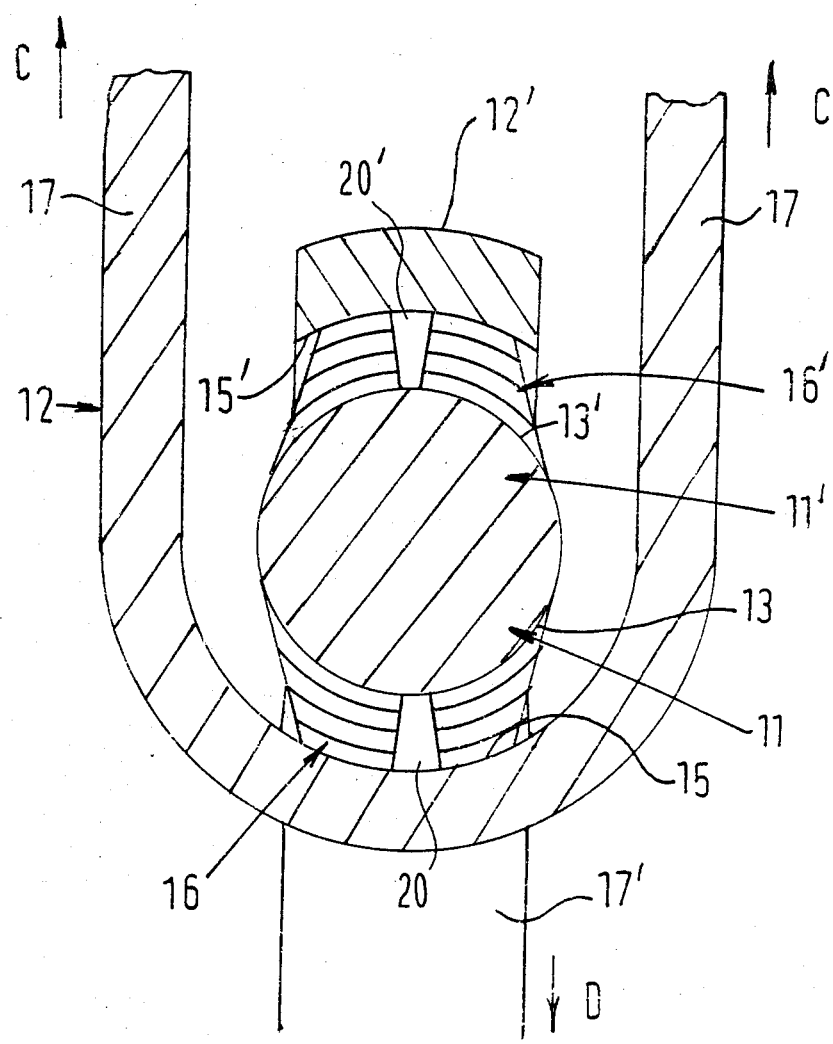
FIG. 3 shows in longitudinal section a second embodiment of joint means according to the present invention.

A second embodiment of joint means according to the present invention is shown in FIG. 3 and essentially comprises two of the joint means shown in FIG. 2 arranged back-to-back and like reference numerals are used to indicate corresponding parts.

As shown the joint means is able to accommodate axial loads generated by tension forces applied to the arms 17 in the direction C and to the arms 17′ in the direction D opposite to the direction C. The joint means may therefore be used as an intermediate connection for example in an anchor line or as an end connection in which one pair of arms 17 or 17′ is connected to a fixed structure.

In addition the back-to-back arrangement of the joint means increases the conical deflection that can be accommodated compared with either one of the joint means individually by allowing a conical deflection to be shared between the bearings 16,16′ so that the full conical deflection is not applied to a single bearing.

Figure 4:
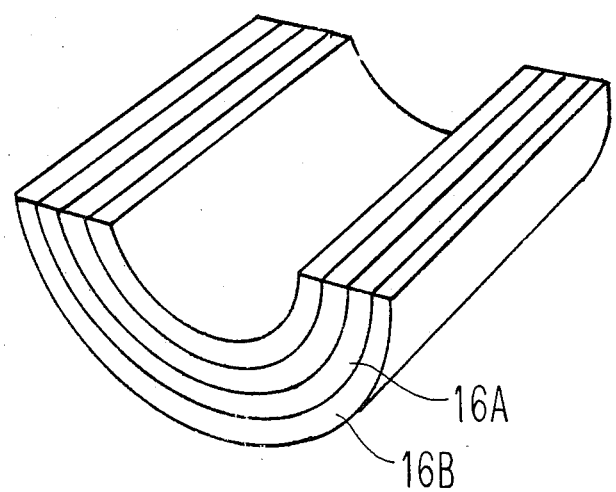
FIG. 4 shows an alternative laminated bearing for use in joint means of the type shown in FIGS. 2 and 3.

FIG. 4 shows an alternative laminated bearing for use in joint means of the type shown in FIGS. 2,3 in which the layers of elastomer and reinforcement plates are of part-cylindrical profile. In an assembled joint means incorporating the bearing of FIG. 4 the confronting surfaces 13,15,13′,15′ on the inner and outer members shown in FIG. 3 would be of complementary part-cylindrical profile allowing relative rotational movement between the members about the central axis of the bearing i.e. relative movement in one plane containing the longitudinal axis of the joint means.

The part-cylindrical bearing may be one-piece as shown in full lines in FIG. 4 or divided into two or more segments as shown in broken lines in FIG. 4.

It will be understood the invention is not restricted to the above-described embodiments. For example the or each outer member of FIGS. 2 and 3 may have three or more axially extending arms uniformly spaced in a circumferential direction around the longitudinal axis of the joint means.

The number of interleaving layers of elastomer and reinforcement plates and the thickness thereof may be varied to give a bearing having the desired load capability and for certain applications the reinforcement plates may be omitted. The or each bearing may be attached to one or both of the confronting surfaces by conventional means for example bonding, welding or mechanical means.

The spherical bearings 16,16′ may have a central opening 20,20 as shown of relatively small dimensions or the opening may be omitted.

The arms of the or each outer member may be integral with the associated body portion as above-described or formed separately and attached to the body portion by any suitable means, e.g. bolting, welding etc. The arms of the or each outer member may be parallel to or inclined relative to the longitudinal axis of the joint means.

Having now described my invention—what is claimed is:

1. An elastomeric joint means for providing a flexible coupling, said joint means having a longitudinal axis and comprising:
    two first members, each of said members having a body portion and at least two arms extending from the body portion, said arms extending generally parallel to and radially spaced from said longitudinal axis in a direction towards the body portion of the other member;
    a second member positioned radially inwards of said arms, the body portions of said two first members each having an internal curved surface and said second member having external curved surfaces disposed opposite to and axially spaced from said internal curved surfaces; and
    elastomeric means acting between and connecting the respective pairs of external and internal curved surfaces.

2. Joint means according to claim 1 wherein said curved surfaces are part-cylindrical and have a common central axis.

3. Joint means according to claim 1 wherein said curved surfaces are part-cylindrical and have a common centre of curvature.

4. Joint means according to claim 1 wherein said arms of said first members are uniformly spaced in a circumferential direction.

5. Joint means according to claim 1 wherein the free ends of said arms of said first members are adapted for connection to common attachment members.

6. Joint means according to claim 1 wherein said elastomeric means comprises a laminated bearing consisting of interleaving layers of elastomeric material and inextensible reinforcement material.

7. Joint means according to claim 6 wherein said bearing has end faces complementary to the profile of said curved surfaces and the individual layers are of similar curved profile.

8. Joint means according to claim 6 wherein said bearing has a central opening.

* * * * *